(12) United States Patent
Bondar

(10) Patent No.: US 10,564,003 B2
(45) Date of Patent: Feb. 18, 2020

(54) MEASURING SYSTEM FOR DETERMINING THE ANGLE OF ROTATION

(71) Applicant: TDK-Micronas GmbH, Freiburg (DE)

(72) Inventor: Yan Bondar, Waldkirch (DE)

(73) Assignee: TDK-Micronas GmbH, Freiburg (DE)

( * ) Notice: Subject to any disclaimer, the term of this patent is extended or adjusted under 35 U.S.C. 154(b) by 82 days.

(21) Appl. No.: 15/941,825

(22) Filed: Mar. 30, 2018

(65) Prior Publication Data

US 2018/0283900 A1 Oct. 4, 2018

(30) Foreign Application Priority Data

Mar. 30, 2017 (DE) .................. 10 2017 003 075

(51) Int. Cl.
*G01D 5/14* (2006.01)
*G01B 7/30* (2006.01)

(52) U.S. Cl.
CPC .................. *G01D 5/14* (2013.01); *G01B 7/30* (2013.01); *G01D 5/147* (2013.01)

(58) Field of Classification Search
CPC ........ G01D 5/145; G01D 5/14; G01D 5/2454; G01D 5/24438; G01D 5/2497; G01D 5/3473; G01D 5/04; G01D 5/245; G01D 11/245; G01D 3/0365; G01D 5/12; G01D 5/142; G01D 5/2013; G01D 5/244; G01D 5/24433; G01D 5/344; G01D 5/56; H02K 11/215; H02K 11/21; H02K 21/22; H02K 29/08; H02K 29/06; H02K 41/031; H02K 7/003; H02K 7/06; H02K 11/20; H02K 11/24; H02K 16/00; H02K 21/14; H02K 7/006; G06F 19/3468; G06F 3/0362; G06F 3/0338; G06F 3/0487; G01B 7/30; (Continued)

(56) References Cited

U.S. PATENT DOCUMENTS 8,461,829 B2 6/2013 Steinich et al.
9,534,931 B2 * 1/2017 Ueda ..................... B25J 19/02
(Continued)

FOREIGN PATENT DOCUMENTS

DE          10158052 A1    6/2003
DE    10 2004 029 483 A1  6/2005
(Continued)

*Primary Examiner* — Vinh P Nguyen
(74) *Attorney, Agent, or Firm* — Muncy, Geissler, Olds & Lowe, P.C.

(57) ABSTRACT

A measuring system for determining an angle of rotation of a shaft, which is rotatable about an axis of rotation, having a magnetically conductive encoder, which is spaced from the axis of rotation and fixedly connected to the shaft, a magnet unit with a permanent magnet, and an intermediate sensor unit having two magnetic field sensors. The permanent magnet has a magnetization extending parallel to the axis of rotation, and a circular-cylindrical recess having a bottom, an axis of symmetry extending perpendicular to the bottom, and a diameter, the sensor unit being completely arranged within the recess and stationary with respect to the permanent magnet. The first distance of the encoder from the axis of rotation being less than half the diameter of the recess, the encoder being arranged in a direction parallel to the axis of rotation at a second distance from the sensor unit.

11 Claims, 3 Drawing Sheets

(58) Field of Classification Search
CPC .............. G01N 33/54326; G01R 33/09; G01R 33/0017; G01R 33/091; G01R 33/0029; G01R 33/0076; G01R 33/038; G01R 33/077; G01R 33/093; G01R 33/096
See application file for complete search history.

(56) References Cited

U.S. PATENT DOCUMENTS

| | | |
|---|---|---|
| 9,719,771 B2 * | 8/2017 | Ausserlechner ......... G01B 7/30 |
| 2005/0007102 A1 | 1/2005 | Butzmann |
| 2008/0164867 A1 | 7/2008 | Steinich et al. |
| 2010/0045287 A1 | 2/2010 | Van Zon |
| 2017/0324304 A1 * | 11/2017 | Ito .......................... H02K 11/21 |

FOREIGN PATENT DOCUMENTS

| | | |
|---|---|---|
| DE | 10 2007 018 759 A1 | 7/2008 |
| DE | 10 2009 051 978 B4 | 10/2015 |
| DE | 10 2014 012 168 A1 | 3/2016 |
| EP | 1610095 B1 | 8/2016 |

* cited by examiner

MEASURING SYSTEM FOR DETERMINING THE ANGLE OF ROTATION

This nonprovisional application claims priority under 35 U.S.C. § 119(a) to German Patent Application No. 10 2017 003 075.8, which was filed in Germany on Mar. 30, 2017, and which is herein incorporated by reference.

BACKGROUND OF THE INVENTION

Field of the Invention

The present invention relates to a measuring system for determining the angle of rotation of a shaft, which is rotatable about an axis of rotation.

Description of the Background Art

Measuring systems are known for the contactless determination of an angle of rotation of a shaft in the conventional art.

From DE 10 2009 051 978 B4 and DE 10 2007 018759 A1 (which corresponds to U.S. Pat. No. 8,461,829), arrangements are known for the angular position detection of a shaft using a magnetic field sensor as an angle sensor. The magnetic field sensor is arranged rotationally fixed relative to the shaft, while co-rotating permanent magnets are mounted as signal generators on the rotating shaft. The magnetic field sensor and the permanent magnets are arranged within a closed or almost closed shielding device to protect against interference from external magnetic fields.

Further measuring devices with additional shielding parts are known from US 2008/0164867 A1 and EP 1 610 095 B1. From DE 10 2004 029 483 A1, also a rotary sensor is known.

The measuring devices have in common that a fixed angle sensor is combined with permanent magnets that are attached to the rotating shaft and that additional an shield against external magnetic fields are provided.

SUMMARY OF THE INVENTION

It is therefore an object of the present invention to provide a device which further develops the prior art.

According to an exemplary embodiment of the invention, a measuring system for determining the angle of rotation is provided, comprising an encoder and a magnet unit and a shaft, which is rotatable about an axis of rotation, and a sensor unit.

The sensor unit can be arranged between the magnet unit and the encoder.

The encoder is formed of a magnetically conductive material and is fixedly connected to the shaft at a first distance from the axis of rotation.

The sensor unit has at least a first magnetic field sensor and a second magnetic field sensor.

The first magnetic field sensor is sensitive with respect to a first magnetic field component that is perpendicular or substantially perpendicular to the axis of rotation.

The second magnetic field sensor is sensitive with respect to a second magnetic field component, which is perpendicular or substantially perpendicular to the axis of rotation and the first magnetic field component.

The magnet unit has a permanent magnet with a magnetization extending essentially or exactly parallel to the axis of rotation.

The permanent magnet can be pot-shaped and has an inner diameter. Also, the permanent magnet can have a recess with a depth and a bottom and an end face and an axis of symmetry extending perpendicular or substantially perpendicular to the bottom.

The axis of symmetry is substantially parallel or exactly parallel to the axis of rotation.

The sensor unit can be completely disposed within the recess and fixedly connected to the permanent magnet.

A first distance of the encoder from the axis of rotation is less than half the diameter of the recess. The encoder can be arranged in a direction parallel to the axis of rotation at a second distance to the sensor unit, wherein the magnet unit can be arranged stationary with respect to the encoder.

A magnetization running parallel to the axis of rotation or axis of symmetry continues correspondingly in a circular-cylindrical depression, so that, or example, in the area of the axis of symmetry, a homogeneous axis-parallel magnetization prevails and the sensor unit is located directly on the magnetization axis. The axis-parallel magnetization is locally modulated by the encoder in such a way that components of the magnetic field can be generated perpendicular to the axis of rotation and are detected by means of the magnetic field sensors.

For example, Hall sensors, GMR sensors, AMR sensors or TMR sensors can be used as magnetic field sensors. By the detection of two magnetic field components extending perpendicular to the axis of rotation, a rotation position detection within 360° is possible, i.e., an absolute angular position is determined by a ATAN calculation.

The magnetic field sensors can be arranged at a central positioning within the recess. For example, an extension of the axis of rotation penetrates the magnetic field sensors at the respective centroid. Alternatively, the centroids are shifted perpendicular to the axis of rotation. The term "end face" can be used synonymously with the term "pole face at the top of the depression".

An advantage is that disturbances of the sensor unit due to external static or dynamic magnetic fields can be reduced by forming the sensor unit within the recess of the permanent magnet.

With a nearly closed arrangement, the height of the shield is very tall, in other words, the magnetic field sensors are quasi in a magnetically closed space within the recess of the permanent magnet.

An elaborate differential measurement with multiple magnetic field sensors to calculate the influence of, for example, homogeneous magnetic fields can be avoided.

Use of a shielding device against external magnetic fields adapted depending on the application can also be avoided.

Another advantage of the solution according to the invention is the particularly simple and inexpensive construction. Also advantageous is the particular robustness and accuracy of the measurement results, since the angle determination does not use a differential magnetic field measurement and therefore the orientation of the sensor unit to the shaft is simple and reliable.

Another advantage is that the angle of rotation between 0° and 360° can always be determined with high precision even when the shaft is at a standstill. This is advantageous in particular in an application for an automatic start-stop device, for example for a motor vehicle, where the influence of interference fields is suppressed.

In an embodiment, the measuring unit has a cover that is fixedly connected to the shaft. The diameter of the shaft on a side facing the recess can be at least approximately as large or exactly as large or larger than the diameter of the recess.

In an embodiment, a disk-shaped cover is arranged on the end face of the shaft and covers the recess at least partially or even completely. For example, the disk-shaped cover can have a curvature.

The disk-shaped cover can have at least the diameter of the recess and is fixedly connected to the end face of the shaft.

The cover can be substantially perpendicular or exactly perpendicular to the axis of rotation and comprises or consists of a magnetically conductive material. The underside of the cover can be at a third distance from the end face in a direction along the axis of rotation. An advantage is that the cover enhances the shielding effect.

The encoder is attached to a side of the cover facing the sensor unit, wherein the cover is at a third distance in a direction along the axis of rotation to the pole face at the top of the recess. For example, the distance of the cover to the end face or to the pole face at the top of the recess can be smaller than 3 mm or lies between 0.2 mm and 0.3 mm.

According to an embodiment, the first magnetic field sensor and the second magnetic field sensor can be penetrated by an imaginary extension of the axis of rotation of the shaft in order to allow for a particularly simple evaluation of the measurement results.

According to an embodiment, the recess of the permanent magnet with the sensor unit arranged therein is at least partially or completely filled, for example with a plastic compound, in particular with a casting resin. The casting compound can cover at least the sensor unit. Together with the casting compound, the magnet unit or the permanent magnet form a housing, which reliably protects the sensor unit against external influences.

According to an embodiment, the sensor unit comprises a semiconductor body and is arranged on the semiconductor body, or the semiconductor body and the sensor unit can be monolithic.

The semiconductor body comprises an evaluation circuit in addition to the sensor unit, wherein the evaluation circuit is electrically connected to the sensor unit. By means of the evaluation circuit, the angle of rotation of the encoder is determined from the first magnetic field component and the second magnetic field component by means of a sufficiently well-documented ATAN calculation.

In an embodiment, at least one electrical line is led out of the permanent magnet from the sensor unit through the bottom of the recess of the permanent magnet.

In an embodiment, the axis of symmetry coincides with the axis of rotation. For example, the two magnetic field sensors are designed as a 2D sensor unit.

In an embodiment, the first magnetic field sensor and the second magnetic field sensor can have a length and a width, wherein the respective length and the respective width are greater than the second distance and less than three times the second distance.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
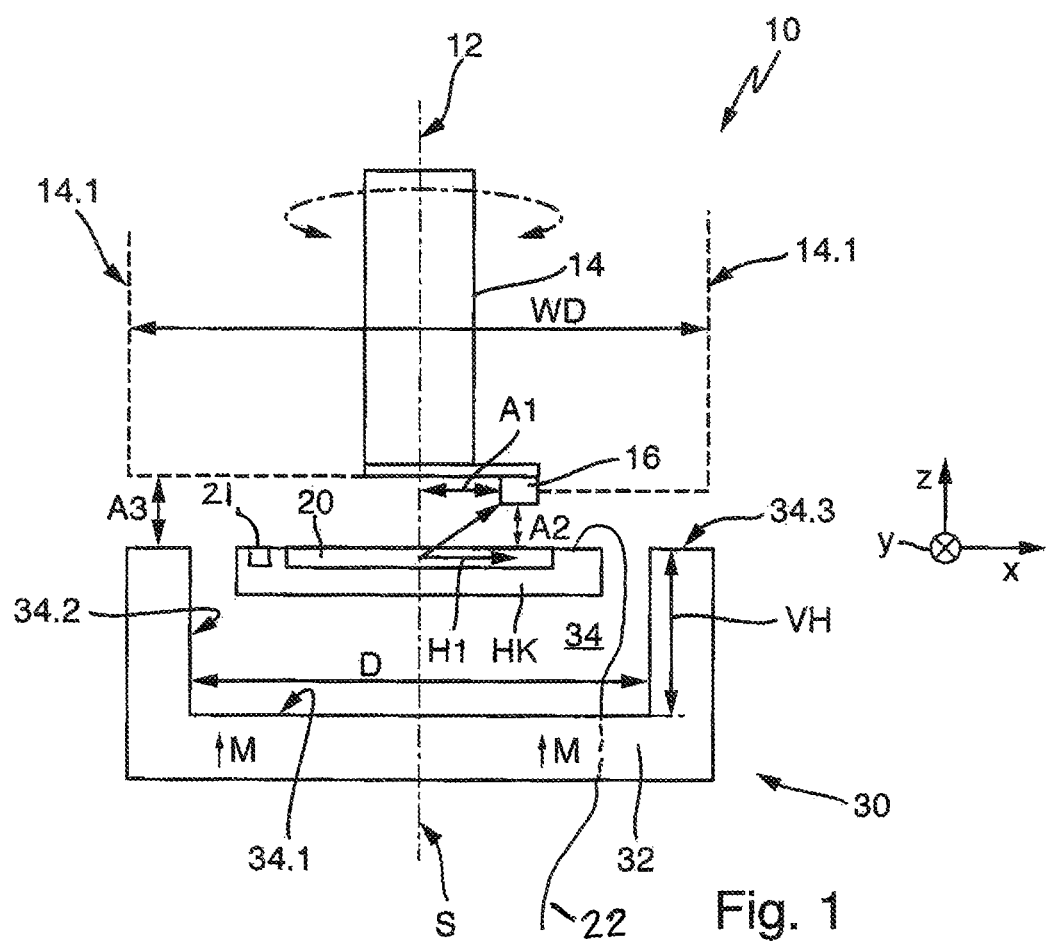
FIG. 1 is a sectional view of an embodiment of a measuring system according to the invention.

The illustration of FIG. 1 shows a sectional view of an embodiment of a measuring system 10 according to the invention for determining the angle of rotation of a shaft 14, which is rotatably mounted about an axis of rotation 12, comprising an encoder 16, a sensor unit 20, an evaluation unit 21 and a magnet unit 30. The rotational movement is outlined by arrows. For reasons of clarity, a coordinate system is additionally indicated.

The magnet unit 30 has a pot-shaped permanent magnet 32 with a magnetization M extending parallel to the axis of rotation 12, i.e., in a z-direction, and a cylindrical recess 34. The recess 34 has a circular bottom 34.1 formed in an x-y plane, a lateral or circumferential surface 34.2, and a circular end face 34.3. The recess 34 has a depth VH and a diameter D and an axis of symmetry S which is formed in the z-direction.

The sensor unit 20 comprises a semiconductor body HK and a first magnetic field sensor for measuring the first magnetic field component H1, which extends perpendicular to the axis of rotation in the y-direction, and a second magnetic field sensor for measuring a second magnetic field component H2, which extends in an x-direction, wherein the second magnetic field component H2 runs perpendicular both to the first magnetic field component H1 and to the axis of rotation 12.

The sensor unit 20 is completely disposed in the recess 34 of the permanent magnet 32. An electrical line 22 is led out of the permanent magnet 32 from the sensor unit 20 through the bottom of the recess 34 of the permanent magnet 32.

The recess 34 is only partially covered by the one end face of the axis of rotation 14. The end face of the shaft 14 acts as a cover. The axis of rotation has a diameter WD formed in the x-y plane. Alternatively, the diameter WD of the shaft 14 is increased up to the dashed line 14.1, so that the shaft 14 completely covers the depression with the end face.

The encoder 16 is made of a ferromagnetic material and is arranged at a first distance A1 from the axis of rotation 12, directly on the end face of the shaft 14, or with a boom on the end face of the shaft 14, so that the encoder 16 follows the rotational movement of the shaft 14. The first distance A1 of the encoder 16 is less than half the diameter D of the recess 34, so that during a rotation of the shaft, the encoder 16 moves fully above and/or even partially within the recess 34. The encoder 16 is at a second distance A2 from the sensor unit 20.

In a direction parallel to the axis of rotation 12, the cover means, i.e., the end face of the shaft 14, is spaced from the permanent magnet 32 in the z-direction by means of a third distance A3, so that a rotational movement of the shaft relative to the permanent magnet 32 is possible without restriction.

The shaft 14 and the cover 40 are arranged relative to the permanent magnet 32 in such a way that the axis of rotation 12 of the shaft 14 coincides with the axis of symmetry S of the recess.

Figure 2:
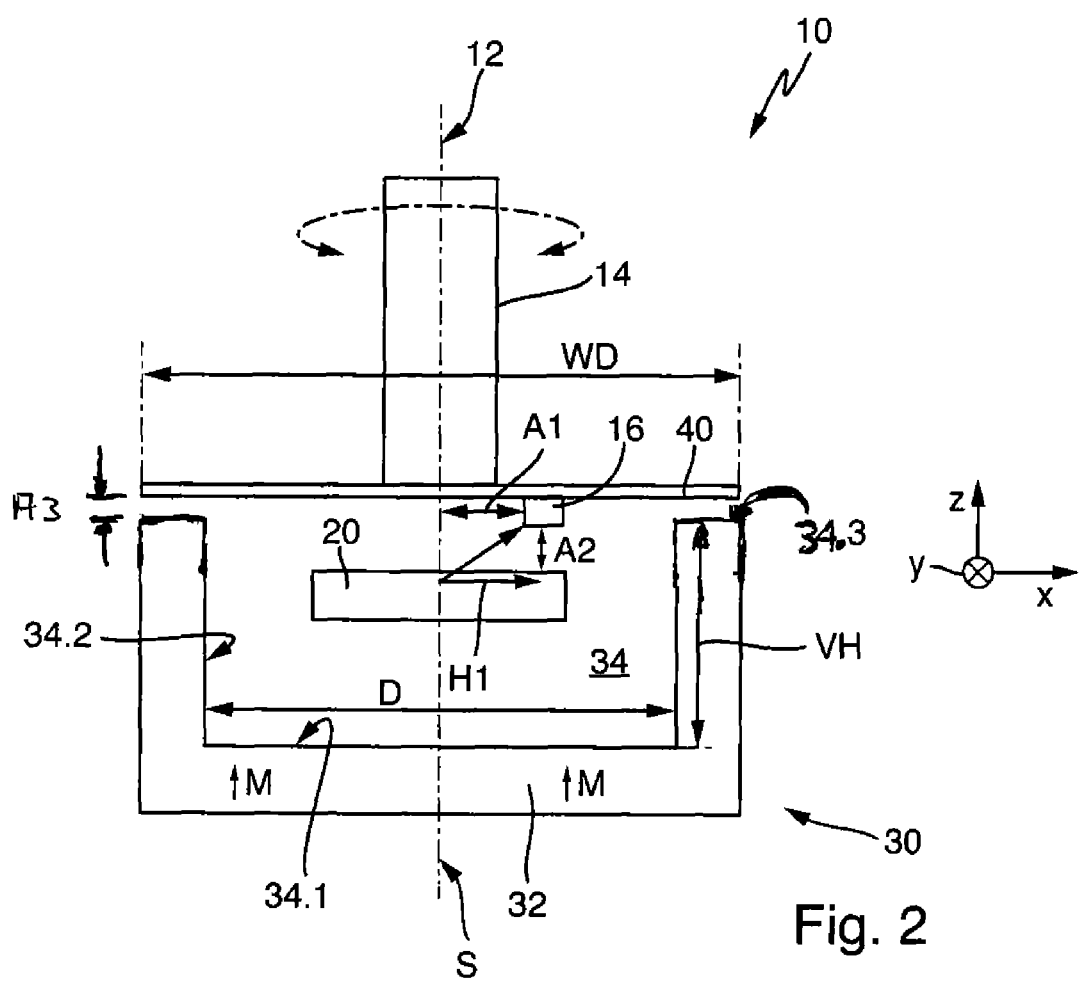
FIG. 2 is a sectional view of an embodiment of a measuring system according to the invention.

The illustration of FIG. 2 shows a sectional view of a second embodiment of a measuring system 10 according to the invention. Subsequently, only the differences from the embodiment shown in FIG. 1 will be explained.

The depression 34 is completely covered by a disk-shaped cover 40 firmly connected to the shaft 14. The disk-shaped cover 40 has the diameter WD. The diameter of the cover 40 is formed substantially larger than the diameter of the shaft 14.

The shaft 14 and the disk-shaped cover 40 are also arranged relative to the permanent magnet 32 such that the axis of rotation 12 of the shaft 14 coincides with the axis of symmetry S of the depression. The disk-shaped cover 40 is spaced from the permanent magnet 32 in the z-direction by means of the third distance A3 such that a rotational movement of the disk-shaped cover 40 relative to the permanent magnet 32 is possible without restriction.

Figure 3:
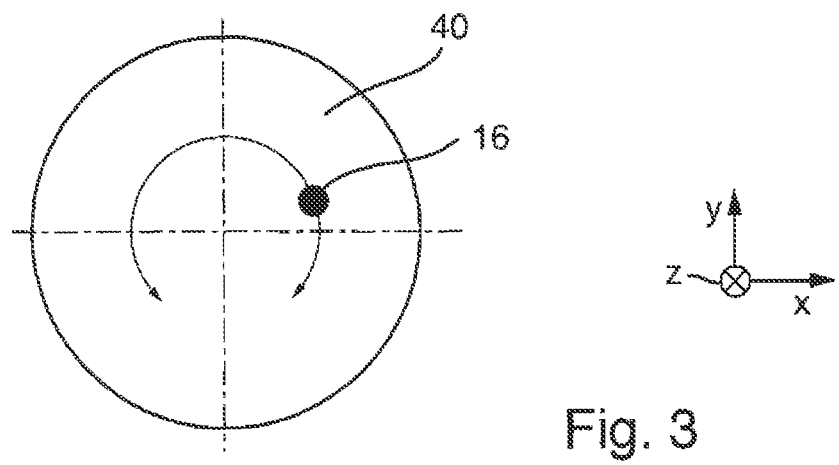
FIG. 3 is a plan view of a cover according to an embodiment of the invention.

The illustration of FIG. 3 shows the outline of a plan view of the disk-shaped cover 40 with the encoder 16 arranged thereon. The path followed by the encoder 16 during a rotation of the shaft 14 is outlined by arrows.

Figure 4:
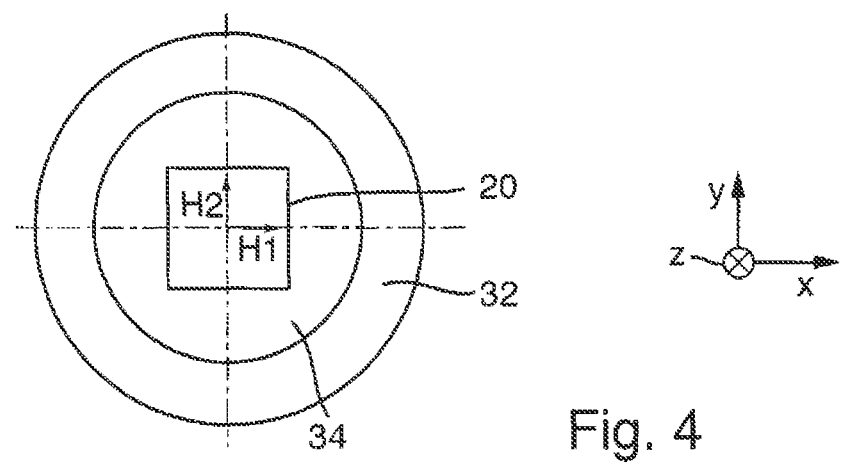
FIG. 4 is a plan view of a magnet unit according to an embodiment of the invention.

FIG. 4 shows a plan view of the permanent magnet 32 and the sensor unit 20 arranged in the recess 34 of the permanent magnet 32.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system for determining an angle of rotation, the measuring system comprising:
an encoder;
a magnet unit;
a shaft that is rotatable about an axis of rotation; and
a sensor unit arranged between the magnet unit and the encoder, the sensor unit comprising at least a first magnetic field sensor and a second magnetic field sensor,
wherein the encoder is formed of a magnetically conductive material and is fixedly connected to the shaft at a first distance from the axis of rotation,
wherein the first magnetic field sensor is sensitive with respect to a first magnetic field component, which is substantially perpendicular to the axis of rotation,
wherein the second magnetic field sensor is sensitive with respect to a second magnetic field component, which is substantially perpendicular to the axis of rotation and to the first magnetic field component,
wherein the magnet unit has a permanent magnet with a magnetization extending substantially or exactly parallel to the axis of rotation,
wherein the permanent magnet is pot-shaped and has an inner diameter and a recess having a depth and a bottom and an end face and an axis of symmetry extending substantially perpendicular to the bottom, and the axis of symmetry extends substantially parallel to the axis of rotation,
wherein the sensor unit is arranged completely within the recess and is fixedly connected to the permanent magnet,
wherein a first distance of the encoder from the axis of rotation is less than half the diameter of the recess,
wherein the encoder is arranged in a direction substantially parallel to the axis of rotation at a second distance from the sensor unit, and
wherein the magnet unit is arranged stationary with respect to the encoder.

2. The measuring system according to claim 1, further comprising a cover with a bottom for shielding the recess against foreign magnetic fields and made of a magnetically conductive material, wherein the cover has a diameter, and the diameter of the cover is at least as great as a diameter of the recess, and an underside of the cover is at a third distance from the end face in a direction along the axis of rotation.

3. The measuring system according to claim 2, wherein the cover is formed of an end face of the shaft or the cover is formed as a disk-shaped cover that is fixedly connected to the shaft, wherein the disk-shaped cover extends substantially perpendicular to the axis of rotation, and wherein the encoder is attached to the side of the disk-shaped cover facing the sensor unit.

4. The measuring system according to claim 2, wherein the third distance of the cover from the end face is less than 3 mm or between 0.2 mm and 0.3 mm.

5. The measuring system according to claim 1, wherein the first magnetic field sensor and the second magnetic field sensor is penetrated by an extension of the axis of rotation of the shaft.

6. The measuring system according to claim 1, wherein the recess of the permanent magnet with the sensor unit arranged therein, is at least partially filled with casting resin.

7. The measuring system according to claim 1, further comprising an evaluation circuit to determine the angle of rotation of the encoder from the first magnetic field component and the second magnetic field component.

8. The measuring system according to claim 1, wherein at least one electrical line is led out of the permanent magnet from the sensor unit through a bottom of the recess of the permanent magnet.

9. The measuring system according to claim 1, wherein the axis of symmetry coincides with the axis of rotation.

10. The measuring system according to claim 1, wherein the two magnetic field sensors are a 2D sensor unit.

11. The measuring system according to claim 1, wherein the first magnetic field sensor and the second magnetic field sensor have a length and a width, and the length and the width are each greater than the second distance and less than three times the second distance.

* * * * *